Figure 1:
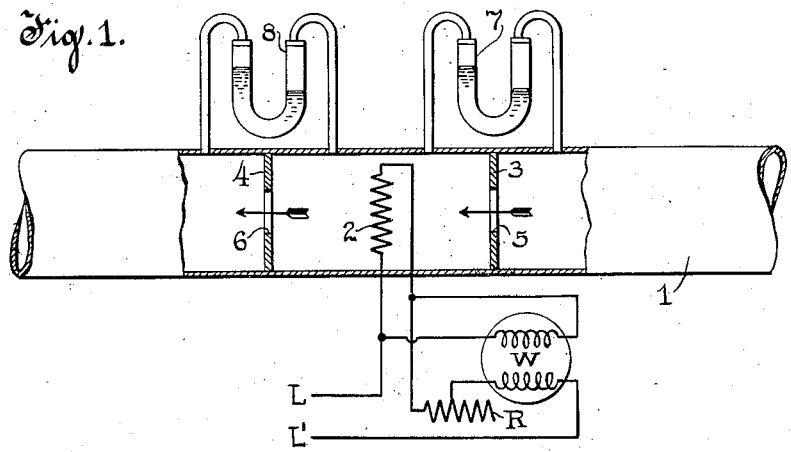

Feb. 10, 1925.

H. N. PACKARD 1,525,463

METHOD OF AND MEANS FOR MEASURING THE FLOW OF FLUID

Filed April 24, 1919

INVENTOR:
Horace N. Packard
BY Frank H. Hubbard
ATTORNEY.

Patented Feb. 10, 1925.

1,525,463

UNITED STATES PATENT OFFICE.

HORACE N. PACKARD, OF MILWAUKEE, WISCONSIN, ASSIGNOR TO THE CUTLER-HAMMER M'F'G CO., OF MILWAUKEE, WISCONSIN, A CORPORATION OF WISCONSIN.

METHOD OF AND MEANS FOR MEASURING THE FLOW OF FLUID.

Application filed April 24, 1919. Serial No. 292,391.

*To all whom it may concern:*

Be it known that I, HORACE N. PACKARD, a citizen of the United States, residing at Milwaukee, in the county of Milwaukee and State of Wisconsin, have invented new and useful Improvements in Methods of and Means for Measuring the Flow of Fluid, of which the following is a full, clear, concise, and exact description, reference being had to the accompanying drawing, forming a part of this specification.

This invention relates to a method of and apparatus for measuring the rate of flow of fluids.

In practice, measurement of the rate of flow of fluids has been accomplished by imparting heat to the flowing fluid or extracting heat therefrom and determining the temperature effect of the heat transfer on the fluid.

The present invention has among its objects to provide for measurement of the rate of flow of fluid by imparting heat to the flowing fluid or extracting heat therefrom and determining the expansive or contractive effect of the heat transfer on the fluid, as the case may be.

A further object is to subject the fluid to pressure drops for facilitating determination of the expansive or contractive effect of the heat transfer on the fluid.

Various other objects and advantages of the invention will hereinafter appear.

The invention will be more specifically described, reference being had to the accompanying drawing which diagrammatically illustrates certain embodiments of the invention, it being understood that various other forms of apparatus may be employed without departing from the scope of the appended claims.

Figure 2:
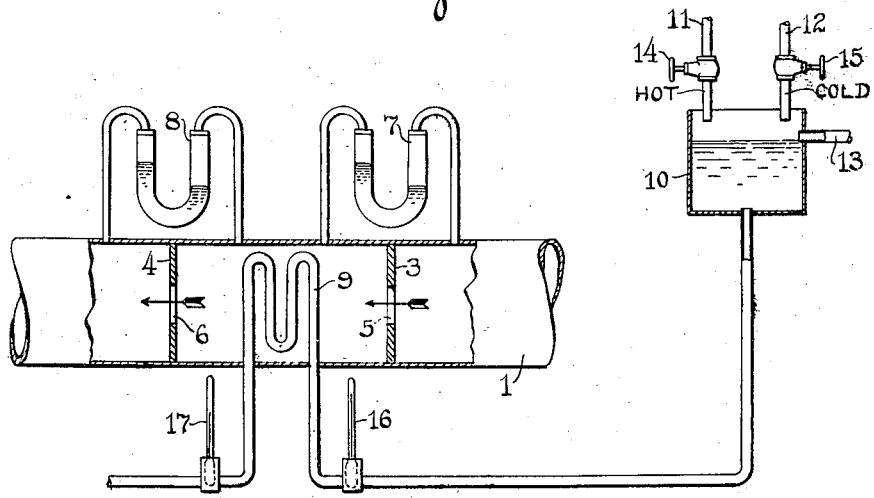

In the drawing,

Figure 1 shows a preferred form of meter wherein heat is imparted to the fluid; and, Fig. 2 shows the meter modified to either impart heat to the fluid or to extract heat therefrom.

Referring to Fig. 1 of the drawing, there is shown a conduit 1 through which the fluid to be measured flows in the direction of the arrows. Within the conduit is arranged a heater 2, shown as comprising an electric resistance, although it may be of any other preferred type, and the conduit is provided on opposite sides of said heater with rings 3 and 4 providing restricted orifices 5 and 6 of like size, through which the fluid is forced to flow, to effect a pressure drop in advance of the heater and also a pressure drop after the fluid has passed the heater. A device 7 is provided for measuring the pressure drop caused by passage of the fluid through the orifice 5, said device being shown as comprising a U-shaped tube containing a liquid and connections between the extremities of said tube and the conduit on opposite sides of the ring 3. A similar device 8 is provided for measuring the pressure drop caused by passage of the fluid through the orifice 6, but it is to be understood that the devices 7 and 8 may be of any other preferred form. The heater 2 is supplied with current from a circuit L—L' through a rheostat R and a wattmeter W is provided to measure the energy input of the heater.

Since the orifices 5 and 6 are of like size, passage of the fluid therethrough, assuming that no energy is supplied to the heater, causes like pressure drops and like readings of the measuring devices 7 and 8. When, however, current is supplied to the heater, it transfers heat to the fluid causing expansion thereof with a consequent increase in the velocity and decrease in density of the fluid passing through the orifice 6, causing a change in the pressure drop measured by the device 8. The expansion of the fluid is directly proportional to the quantity of heat imparted to unit weight of the fluid and the change in pressure drop is approximately proportional to the expansion of the fluid. Thus if the specific heat of the fluid be known, the rate of flow may be ascertained by measurement of the energy input of the heater required to maintain a constant ratio other than unity between the pressure drops measured by the devices 7 and 8 or may be ascertained from the variations in ratio of said pressure drops, the energy input of the heater being constant.

In the meter described the rheostat R provides means by which the energy input of the heater may be varied, control of the rheostat being effected in any preferred manner, while the wattmeter affords means whereby the energy input of the heater may be ascertained.

Referring to Fig. 2, the meter is provided with a fluid containing coil 9 in lieu of the electrical heater shown in Fig. 1, said coil serving according to the temperature of the fluid supplied thereto, to either impart heat to the fluid to be measured or to extract heat therefrom. The coil 9 is provided with a fluid supply tank 10 fed by pipes 11 and 12 and provided with an overflow pipe 13 whereby a constant rate of supply to said coil is maintained. The pipes 11 and 12 respectively supply hot and cold fluids and are provided with valves 14 and 15 respectively whereby temperature of the fluid supplied to the coil may be regulated. Further, said coil is provided with a pair of thermometers 16 and 17 to respectively indicate the temperature of the supplied fluid as it enters said coil and the temperature of such fluid as it leaves said coil. Thus the thermometer affords means for ascertaining the rate of heat transfer between the coil and the fluid to be measured regardless of the direction of heat transfer.

If the fluid supplied to the coil 9 has a temperature exceeding that of the fluid to be measured then the meter enables ascertainment of the rate of flow of fluid in the conduit in the ways above described, i. e. either from the variations in the ratio of the pressure drops measured by devices 7 and 8, the rate of heat transfer being maintained constant, or by measurement of the rate of heat transfer required to maintain a constant ratio between the pressure drops. Also the rate of flow of the fluid may be ascertained in the same ways if the fluid supplied to the coil be of a lower temperature than that of the fluid to be measured. Under the latter conditions the heat transfer is from the fluid to be measured to the coil with a consequent contraction of the fluid between the orifices 5 and 6, such contraction being directly proportional to the quantity of heat transferred from the fluid to be measured to the coil. And such contraction of the fluid changes the pressure drop measured by the device 8 approximately proportionally to the contraction whereby the rate of flow of the fluid in the conduit may be ascertained with equal facility and accuracy as under the conditions first discussed.

What I claim as new and desire to secure by Letters Patent is:

1. The method of measuring the rate of flow of a fluid of known specific heat, which includes effecting a known heat transfer involving the moving fluid and determining the velocity change effected in the fluid by such heat transfer.

2. The method of measuring the rate of flow of a stream of fluid of known specific heat, which comprises effecting a known heat transfer involving the flowing fluid to produce a volumetric change therein, and utilizing the pressure effect of the resultant change in velocity of the flowing fluid in ascertaining the rate of flow thereof.

3. The method of ascertaining the rate of flow of a fluid of known specific heat, which comprises effecting a definite heat transfer involving the flowing fluid, comparing the rates of flow of the fluid before and after such heat transfer, regulating the rate of the heat transfer to keep constant one of two factors, namely, the rate of the heat transfer or the resultant change in velocity of flow of the fluid, and determining the other of said factors.

4. The method of measuring the rate of flow of a fluid which includes effecting a known rate of heat transfer involving the fluid for producing a volumetric change therein, regulating the rate of heat transfer to keep constant one of two factors, namely, the rate of heat transfer or the volumetric change produced and determining the other of said factors.

5. A fluid meter comprising means arranged in heat transferring relation with the flowing fluid, means for causing pressure drops in the fluid respectively before and after the heat transfer, means for measuring such pressure drops, and means for measuring the rate of heat transfer.

6. A fluid meter comprising means for reducing the cross sectional area of the stream of fluid to be measured at spaced points, means for measuring the pressure drops in the fluid at such points, means located between such points in a heat transferring relation with the fluid to effect a volumetric change of the fluid, and means for measuring the rate of heat transfer.

7. A fluid meter comprising a conduit having therein at spaced points restricted orifices of like size through which the fluid to be measured is forced to flow with consequent pressure drops, means for measuring such pressure drops and means located between such orifices and in a heat transferring relation with the fluid to effect a known heat transfer and consequent volumetric change of the fluid.

8. A fluid meter comprising means arranged in a heat transferring relation with the fluid to effect a volumetric change of the fluid, means for causing a pressure drop in the fluid before and after the heat transfer, means for measuring the pressure drops and means for measuring the rate of heat transfer required to maintain a constant ratio of the pressure drops.

In witness whereof, I have hereunto subscribed my name.

HORACE N. PACKARD.